(12) United States Patent
Matsumoto et al.

(10) Patent No.: US 11,420,504 B2
(45) Date of Patent: Aug. 23, 2022

(54) COUPLING STRUCTURE OF TOUCH SENSOR

(71) Applicant: NISHIKAWA RUBBER CO., LTD., Hiroshima (JP)

(72) Inventors: Michihiko Matsumoto, Hiroshima (JP); Masaki Niwa, Kariya (JP); Hironori Koeda, Kariya (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 361 days.

(21) Appl. No.: 16/737,568

(22) Filed: Jan. 8, 2020

(65) Prior Publication Data
US 2020/0223295 A1  Jul. 16, 2020

(30) Foreign Application Priority Data
Jan. 10, 2019  (JP) .............................. JP2019-003007

(51) Int. Cl.
*B60J 5/06*  (2006.01)
*B60J 5/04*  (2006.01)
B60R 11/00  (2006.01)
E05F 15/43  (2015.01)
E05F 15/42  (2015.01)
B29C 45/14  (2006.01)
*B60J 10/86*  (2016.01)
(Continued)

(52) U.S. Cl.
CPC .............. *B60J 5/06* (2013.01); *B60J 5/0411* (2013.01); *B29C 45/14* (2013.01); *B29C 65/48* (2013.01); *B60J 10/86* (2016.02); *B60R 11/00* (2013.01); *E05F 15/42* (2015.01); *E05F 15/43* (2015.01); *E05F 15/44* (2015.01); *E05Y 2800/12* (2013.01); *E05Y 2800/26* (2013.01); *E05Y 2800/27* (2013.01); *E05Y 2900/531* (2013.01)

(58) Field of Classification Search
CPC .. B60J 5/06; B60J 5/0411; B60J 10/86; E05Y 2800/12; E05Y 2800/26; E05Y 2800/27; E05Y 2900/531; E05F 15/44; E05F 15/42; E05F 15/43; B60R 11/00; B29C 45/14; B29C 65/48
USPC ....................................................... 296/155
See application file for complete search history.

(56) References Cited

U.S. PATENT DOCUMENTS 7,055,885 B2 *  6/2006  Ishihara .................. E05F 15/44
                                                            200/61.43
8,348,330 B2 *  1/2013  Higgins .............. B60R 16/0215
                                                                 49/27

FOREIGN PATENT DOCUMENTS

JP         5007829 B2        6/2012
JP         5007829 B2 *      8/2012

OTHER PUBLICATIONS

U.S. Appl. No. 16/681,527; First Named Inventor: Michihiko Matsumoto; Title: "Coupling Structure of Touch Sensor"; filed Nov. 12, 2019.

\* cited by examiner

*Primary Examiner* — D Glenn Dayoan
*Assistant Examiner* — Dana D Ivey
(74) *Attorney, Agent, or Firm* — Holtz, Holtz & Volek PC

(57)  ABSTRACT

A part of a touch sensor, which couples to a curve of a flange, includes a raising member. The curve of the flange is on a belt line of a sliding door. The raising member rises outwardly toward an exterior of the automobile from an inner-cabin side wall of the touch sensor. A space is formed between the raising member and an outer-cabin side wall for (Continued)

the flange to be inserted into the space. The raising member includes a plurality of blocks. The plurality of blocks exist along an upper and lower direction of the automobile body.

6 Claims, 9 Drawing Sheets

(51) Int. Cl.
*E05F 15/44* (2015.01)
*B29C 65/48* (2006.01)

V – V

COUPLING STRUCTURE OF TOUCH SENSOR

CROSS REFERENCE TO RELATED APPLICATION

This application claims the benefit under 35 USC § 119 of JP Patent Application JP 2019-003007 filed Jan. 10, 2019, the entire disclosure of which is incorporated herein by reference.

BACKGROUND INFORMATION

The present invention relates to a coupling structure and a manufacturing method of a touch sensor. When objects including fingers are disposed between an opening of an automobile body and a sliding door on a wagon, a station wagon or the like, a sensor of a touch sensor outputs a corresponding signal for detecting the objects.

A touch sensor 10 couples to a sliding door 1 on a wagon illustrated in FIGS. 10 and 11. The sliding door 1 moves between at least two positions to open and close the opening of the automobile body. The touch sensor 10 extends in an upper and a lower direction of the automobile body and extends toward a front of the automobile body from a front end surface of the sliding door 1.

As illustrated in FIG. 12, the touch sensor 10 includes: an installation base member 11, a hollow part 12, an oblique wall 14, and a seal lip 15. The installation base member 11 couples to a hem flange 40, has a substantially U-shaped cross section including an inner-cabin side wall 11a, an outer-cabin side wall 11b, and a connecting wall 11c. The hollow part 12 is integrally molded with the connecting wall 11c of the installation base member 11. The oblique wall 14 extends toward an exterior of the automobile and slopes rearward from a rear end of the outer-cabin side wall 11b. The seal lip 15 extends toward an interior of the automobile and slopes frontward from a rear end of the oblique wall 14.

The seal lip 15 faces and makes elastic contact with an inner-cabin side surface of a front door 2 when the sliding door 1 is in a closed position. A sensor (pressure sensitive sensor) 160 is fixed in the hollow part 12 and outputs a corresponding electric signal upon detecting the objects such as a part of human bodies (fingers, hands or legs) between the sliding door 1 and the opening of the automobile body.

The installation base member 11 has a plurality of anchoring parts 16 formed on an inner side and a core 17 embedded in the installation base member 11. The anchoring parts 16 extend toward the inner side and hold the flange 40 by making elastic contact. The core 17 has a substantially U-shaped cross section and increases rigidity of the installation base member 11.

As illustrated in FIG. 11, the flange 40 has a substantially S shape in accordance with a shape of the sliding door 1 on a belt line 30. More specifically, the flange 40 has a curve 1c on the belt line 30. The curve 1c has a convex shape toward the interior of the automobile.

The touch sensor 10 is formed by extrusion molding. When fixing the touch sensor 10 on the sliding door 1, the touch sensor 10 does not follow the curve 1c systematically. In other words, the touch sensor 10 is pressed toward the exterior of the automobile. Accordingly, the flange 40 applies force on the part of the touch sensor 10 on the belt line 30 to approach the exterior of the automobile.

In this connection, preventive measures against the force which acts on the touch sensor 10 toward the exterior of the automobile include: crushing the installation base member 11 on the part of the touch sensor 10 on the curve 1c such that an opening of the installation base member 11 narrows; and adhering a rubber plate on an outer-cabin side surface of the inner-cabin side wall 11a on the curve 1c. With these configurations, the installation base member 11 is partially increased in strength to hold the flange 40.

Unfortunately, however, crushing the installation base member 11 and adhering the rubber plate increases number of processes and complicates operations. Especially, crushing the installation base member 11 to narrow the opening of the installation base member 11 differentiates appearance of the crushed part of the installation base member 11 from another part. Also, adhering the rubber plate may spot products with adhesive which adheres to unexpected positions and the rubber plate is hard to arrange on a fixed position.

In this connection, Japanese Patent No. 5007829 discloses a fitting-type spacer which does not necessitate the adhesive. The spacer has a shape of a plate and is made of rubber. Unfortunately, however, the spacer may shift with shocks and the touch sensor does not couple to the curve of the flange stably.

Therefore, an object of the present invention is to provide the coupling structure and the manufacturing method of the touch sensor capable of following the curve of the flange systematically and coupling to the curve of the flange stably.

SUMMARY

In order to achieve the above-mentioned object, according to one aspect of the invention, a coupling structure of a touch sensor is provided. The coupling structure includes a sliding door (1), a flange (40), and the touch sensor (50).

The sliding door (1) moves between at least two positions to open and close an opening of an automobile body.

The flange (40) is formed on a front edge of the sliding door (1). The flange (40) extends in an upper and lower direction of the automobile body and has a curve (1c) on a belt line (30). The curve (1c) has a convex shape toward an interior of the automobile.

The touch sensor (50) couples to the flange (40). The touch sensor (50) includes an installation base member (51), a hollow part (52), and a sensor (160).

The installation base member (51) has a substantially U-shaped cross section including an inner-cabin side wall (51a), an outer-cabin side wall (51b), and a connecting wall (51c). The connecting wall (51c) connects the side walls (51a, 51b). The installation base member (51) has a plurality of anchoring parts (56) formed on an inner side. The anchoring parts (56) extend toward the inner side.

The hollow part (52) is unified with the connecting wall (51c). The hollow part (52) makes elastic contact with an object disposed between the sliding door (1) and the opening of the automobile body or a rear end of a front door (2).

The sensor (160) is fixed in the hollow part (52). When the object makes contact with the hollow part (52), the sensor (160) outputs corresponding electric signal.

A part of the touch sensor (50), which couples to the curve (1c) of the flange (40), includes a raising member (70). The raising member (70) rises outwardly toward an exterior of the automobile from the inner-cabin side wall (51a). A space (100) is formed between the raising member (70) and the outer-cabin side wall (51b) for the flange (40) to be inserted into the space (100). The raising member (70) includes a plurality of blocks (71). The plurality of blocks (71) exist along the upper and lower direction of the automobile body.

In addition, according to an aspect of the present invention, the plurality of the blocks (71), which form the raising member (70), are continuous and integral.

In addition, according to an aspect of the present invention, the blocks (71) have grooves (75) formed on outer-cabin side surfaces of the blocks (71).

In addition, according to an aspect of the present invention, the blocks (71) have supporting pillars (72) between two adjacent blocks (71) and the grooves (75) formed on outer-cabin side surfaces of the pillars (72).

In addition, according to an aspect of the present invention, the plurality of the blocks (71), which form the raising member (70), are formed at regular intervals.

In addition, according to an aspect of the present invention, an upper end and a lower end of the raising member (70) have oblique surfaces (73, 74) respectively. The oblique surfaces (73, 74) extend toward a lower part and the exterior of the automobile and an upper part and the exterior of the automobile, respectively, in relation to a surface perpendicular to the inner-cabin side wall (51a).

In addition, according to an aspect of the present invention, the blocks (71) are square hollow with one surface of each of the blocks (71) open. The surfaces which are open are arranged on an opening of the installation base member (51).

In addition, according to one aspect of the invention, a manufacturing method of a touch sensor is provided. The manufacturing method employs a sliding door (1), a flange (40), and the touch sensor (50).

The sliding door (1) moves between at least two positions to open and close an opening of the automobile body.

The flange (40) is formed on a front edge of the sliding door (1). The flange (40) extends in an upper and lower direction of the automobile body and has a curve (1c) on a belt line (30). The curve (1c) has a convex shape toward an interior of the automobile.

The touch sensor (50) couples to the flange (40). The touch sensor (50) includes an installation base member (51), a hollow part (52), and a sensor (160).

The installation base member (51) has a substantially U-shaped cross section including an inner-cabin side wall (51a), an outer-cabin side wall (51b), and a connecting wall (51c). The connecting wall (51c) connects the side walls (51a, 51b). The installation base member (51) has a plurality of anchoring parts (56) formed on an inner side. The anchoring parts (56) extend toward the inner side.

The hollow part (52) is unified with the connecting wall (51c). The hollow part (52) makes elastic contact with an object disposed between the sliding door (1) and the opening of the automobile body or a rear end of a front door (2).

The sensor (160) is fixed in the hollow part (52). When the object makes contact with the hollow part (52), the sensor (160) outputs corresponding electric signal.

The method includes: forming the touch sensor (50) by extrusion molding;

forming a raising member (70) by die molding on a part of the touch sensor (50), which couples to the curve (1c) of the flange (40); and forming a space (100) between the raising member (70) and the outer-cabin side wall (51b) for the flange (40) to be inserted. The raising member (70) rises outwardly toward an exterior of the automobile from the plurality of anchoring parts (56). The raising member (70) includes a plurality of blocks (71). The plurality of blocks (71) exist along the upper and lower direction of the automobile body.

In addition, according to one aspect of the invention, a manufacturing method of a touch sensor is provided. The manufacturing method employs a sliding door (1), a flange (40), and the touch sensor (50).

The sliding door (1) moves between at least two positions to open and close an opening of the automobile body.

The flange (40) is formed on a front edge of the sliding door (1). The flange (40) extends in an upper and lower direction of the automobile body and has a curve (1c) on a belt line (30). The curve (1c) has a convex shape toward an interior of the automobile.

The touch sensor (50) couples to the flange (40). The touch sensor (50) includes an installation base member (51), a hollow part (52), and a sensor (160).

The installation base member (51) has a substantially U-shaped cross section including an inner-cabin side wall (51a), an outer-cabin side wall (51b), and a connecting wall (51c). The connecting wall (51c) connects the side walls (51a, 51b). The installation base member (51) has a plurality of anchoring parts (56) formed on an inner side. The anchoring parts (56) extend toward the inner side.

The hollow part (52) is unified with the connecting wall (51c). The hollow part (52) makes elastic contact with an object disposed between the sliding door (1) and the opening of the automobile body or a rear end of a front door (2).

The sensor (160) is fixed in the hollow part (52). When the object makes contact with the hollow part (52), the sensor (160) outputs corresponding electric signal.

The method includes: forming the touch sensor (50) by extrusion molding;

cutting out an opening end of the inner-cabin side wall (51a), which is formed by extrusion molding, and forming a die-molded inner-cabin side wall (61) and a raising member (70) by die molding on a part of the touch sensor (50), which couples to the curve (1c) of the flange (40); and forming a space (100) between the raising member (70) and the outer-cabin side wall (51b) for the flange (40) to be inserted. The raising member (70) rises outwardly toward an exterior of the automobile from the die-molded inner-cabin side wall (61). The raising member (70) includes a plurality of blocks (71). The plurality of blocks (71) exist along the upper and lower direction of the automobile body.

Symbols in parentheses show constituents or items corresponding to the drawings.

According to the present invention, the part of the touch sensor, which couples to the curve of the flange on the sliding door, includes the raising member formed by die molding. The raising member rises outwardly toward the exterior of the automobile from the inner-cabin side wall. The raising member includes the plurality of blocks which exist along the upper and lower direction of the automobile body. With this configuration, the touch sensor systematically follows the curve. In other words, the touch sensor is not subjected to force from the flange to approach the exterior of the automobile even without crushing a part of the installation base member or adhering an extra rubber plate or the like on the installation base member as in the prior art.

Also, the space is formed between the raising member and the outer-cabin side wall for the flange to be inserted into the space. With this configuration, the touch sensor stably couples to the flange and hardly shifts with shocks on the touch sensor.

The raising member may be formed by die molding, to rise outwardly toward the exterior of the automobile from the inner-cabin side wall formed by extrusion molding. Alternatively, the raising member may be formed by cutting out the opening end of the inner-cabin side wall formed by extrusion molding, and forming the die-molded inner-cabin side wall and the raising member by die molding to rise outwardly toward the exterior of the automobile from the die-molded inner-cabin side wall. Alternatively, the raising member may be formed to rise outwardly toward the exterior of the automobile by die molding from the plurality of anchoring parts on the inner-cabin side wall formed by extrusion molding by pressing the anchoring parts.

Especially, cutting out the inner-cabin side wall formed by extrusion molding, and forming the die-molded inner-cabin side wall and the raising member by die molding increases an area of close adherence between a part formed by extrusion molding and a part formed by die molding, and then increases adhesion strength.

The hollow part with the sensor fixed in the hollow part is curved along the curve without an extra process including cutout. This configuration does not damage a function of the sensor.

The plurality of the blocks which form the raising member may be continuous and integral, or formed at regular intervals. But the blocks which are continuous and integral are easier to form by die molding.

The blocks which are continuous and integral have the grooves formed on the outer-cabin side surfaces of the blocks. With this configuration, the touch sensor follows the curve of the flange more systematically. The followability improves even more with the configuration that the grooves are formed on the outer-cabin side surfaces of the pillars between two adjacent blocks.

In addition, the upper end and the lower end of the raising member have the oblique surfaces which extend toward the lower part and the exterior of the automobile and the upper part and the exterior of the automobile, respectively, in relation to the surface perpendicular to the inner-cabin side wall. With this configuration, the touch sensor does not get caught by the flange while coupling to the flange.

In addition, the blocks are square hollow with one surface of each of the blocks open, and the open surfaces are arranged on the opening of the installation base member. This configuration prevents unnecessary compression of the hollow part with the sensor fixed in the follow part as compared with solid blocks.

More specifically, when the touch sensor follows a curve which is small in a curvature radius and couples to the flange, deformation of the blocks which are square hollow absorb reaction from the curve and tensile force on the open surfaces of the blocks (close to end parts of the side walls of the installation base member). With this configuration, compression of the sensor in the hollow part is prevented through closed surfaces (close to connecting wall of the installation base member) of the blocks which are square hollow. On the other hand, the solid blocks do not deform as the blocks which are square hollow. Accordingly, the reaction from the curve and the tensile force on the side walls of the installation base member travel to the hollow part through surfaces of the blocks (close to connecting wall of the installation base member). As a result, the sensor in the hollow part is compressed and may result in a persistent connection. As the touch sensor results in the persistent connection, the sensor is incapable of detecting the objects.

DETAILED DESCRIPTION

Figure 1:
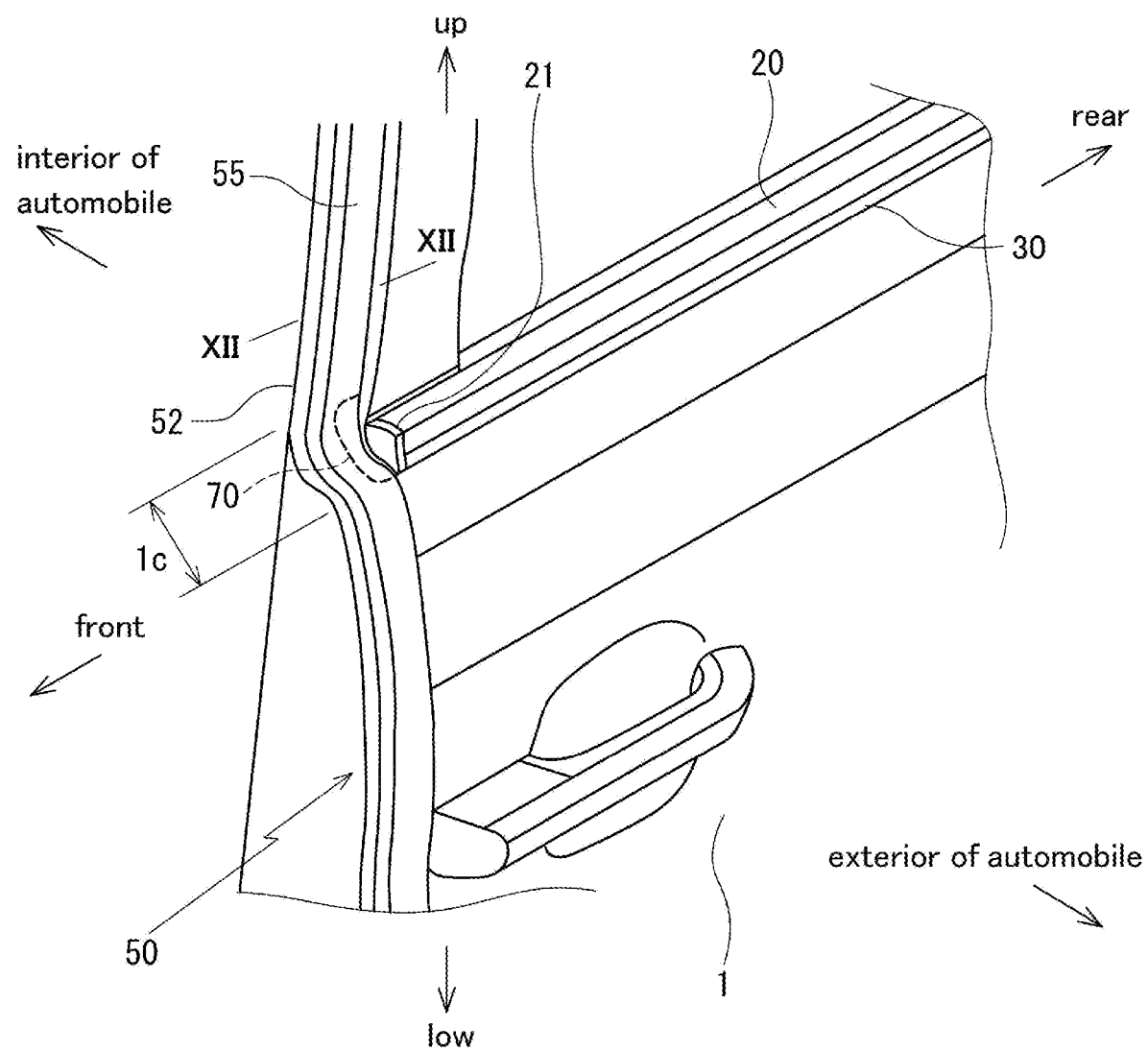
FIG. 1 is a perspective view of a left touch sensor according to an embodiment of the invention coupling to a left sliding door.

Referring to the Drawings, a coupling structure and a manufacturing method of a touch sensor will be described.

As illustrated in FIG. 1 to FIG. 5 and FIG. 10, a touch sensor 50 according to an embodiment of the present invention couples to a flange 40 on a front end of a sliding door 1. The sliding door 1 moves between at least two positions to open and close an opening of an automobile body. The touch sensor 50 protrudes toward a front side of the automobile body from the flange 40. It is to be noted that words "a front and a rear" indicate a front and rear direction of the automobile body. In the embodiment, a part closer to a hollow part 52 of the touch sensor 50 is a front side of the automobile body, and a part closer to an installation base member 51 is a rear side of the automobile body.

Figure 5:
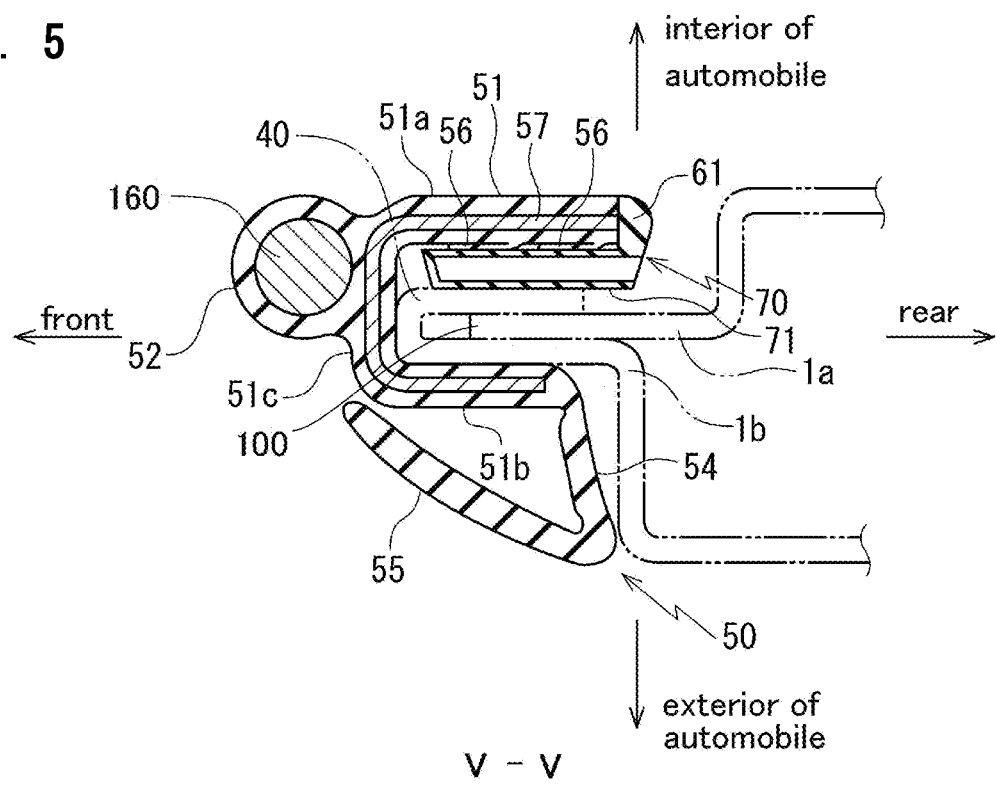
FIG. 5 is an enlarged cross-sectional view taken along line V-V of FIG. 4.

As illustrated in FIG. 5, the flange (hem flange) 40 on the sliding door 1 is formed by folding an end of an outer panel 1b toward an interior of the automobile and piling the end of outer panel 1b on an inner-cabin side of an end of an inner panel 1a. As illustrated in FIG. 1, the flange 40 extends in an upper and lower direction of the automobile body and has a curve 1c on a belt line 30. The curve 1c has a convex shape toward an interior of the automobile. In addition, a belt line weather strip 20 is horizontal with the belt line 30 and couples to an outer-cabin side of the belt line 30. An end cap 21 is fit on an end of the belt line weather strip 20.

Figure 2:
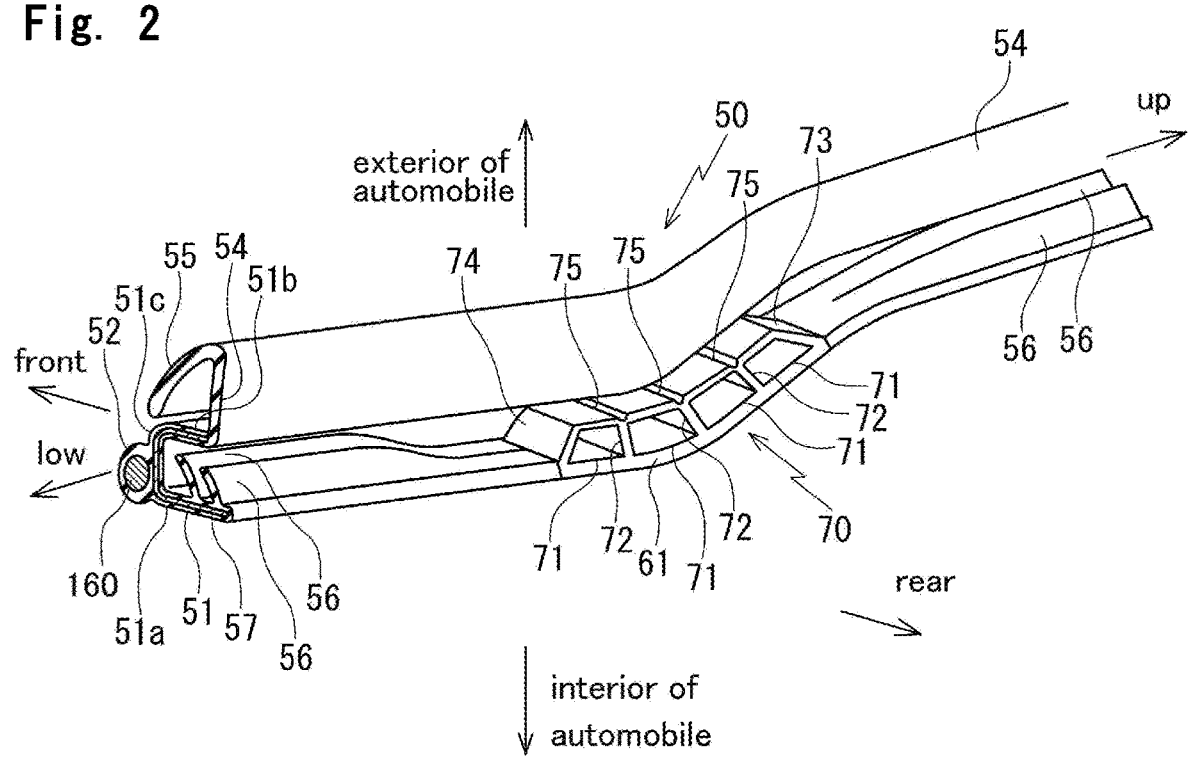
FIG. 2 is an enlarged perspective view of the touch sensor of FIG. 1.

In addition, as illustrated in FIG. 2 (flange 40 omitted) and FIG. 5, a sensor (pressure sensitive sensor) 160, fixed in the follow part 52 of the touch sensor 50, outputs a corresponding electric signal upon detecting an object such as a part of human bodies (fingers, hands or legs) between the sliding door 1 and the opening of the automobile body, a rear end of a front door 2 in the present embodiment. The touch sensor 50 couples to the flange 40.

Figure 12:
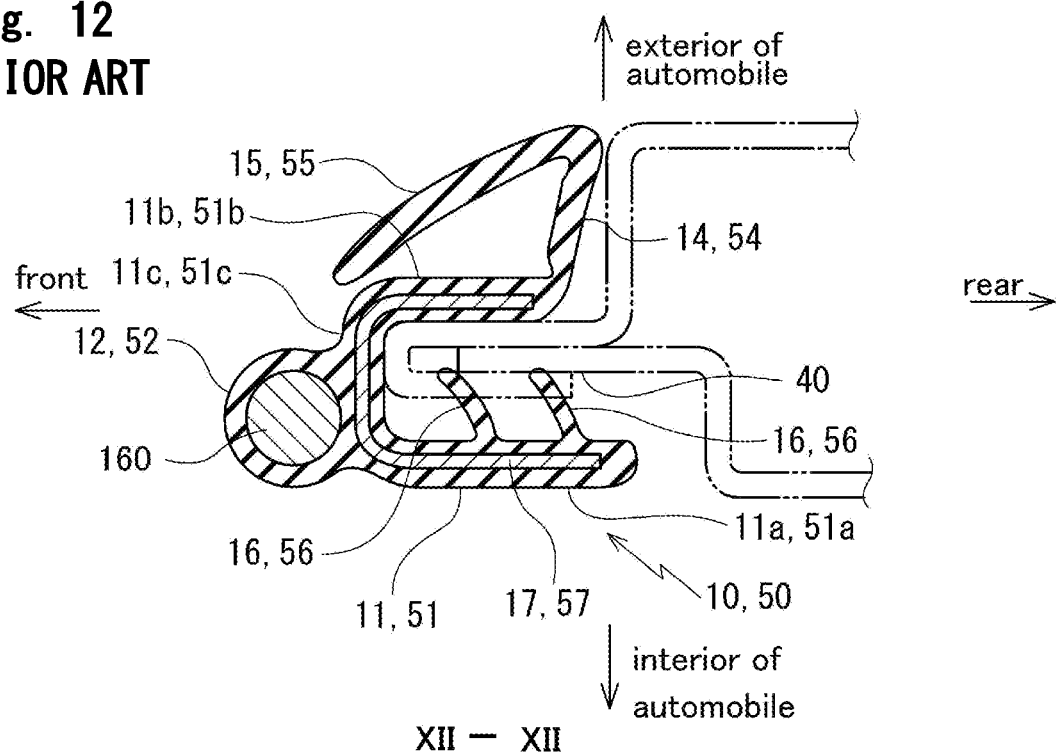
FIG. 12 is an enlarged cross-sectional view of the touch sensor taken along line XII-XII of FIG. 1 and line XII-XII of FIG. 11 with the touch sensor coupling to the sliding door.

The touch sensor 50 is formed by extrusion molding. The touch sensor 50 includes an installation base member 51, a hollow part 52, a oblique wall 54, and a seal lip 55 in the same manner as FIG. 12, except for a part which couples to the curve 1c of the flange 40, in other words, on an upper side and a lower side relative to the curve 1c. The installation base member 51 directly couples to the flange 40, has a substantially U-shaped cross section including an inner-cabin side wall 51a, an outer-cabin side wall 51b, and a connecting wall 51c. The connecting wall 51c connects the side walls 51a, 51b. The hollow part 52 is integrally molded with the connecting wall 51c of the installation base member 51. The oblique wall 54 extends toward an exterior of the automobile and slopes rearward from a rear end of the outer-cabin side wall 51b. The seal lip 55 extends toward an interior of the automobile and slopes frontward direction from a rear end of the oblique wall 54. The seal lip 55 faces and makes elastic contact with a rear end of a front door 2 when the sliding door 1 is in a closed position. The installation base member 51 has a plurality of anchoring parts 56 formed on an inner side and a core 57 embedded in the installation base member 51. The anchoring parts 56 extend toward the inner side and hold the flange 40 by making elastic contact. The core 57 has a substantially U-shaped cross section and increases rigidity of the installation base member 51. The sensor 160 is fixed in the hollow part 52.

The hollow part 52 makes elastic contact with the object disposed between the sliding door 1 and the rear end of the front door 2 when the sliding door 1 is moved towards a closed position. The sensor 160 in the hollow part 52 outputs a corresponding electric signal upon detecting the object between the sliding door 1 and the rear end of the front door 2 to open the sliding door 1, which is moved towards the closed position.

The sensor 160 has two core wires (electrode wires) embedded in two rubber like elastic bodies (conductive parts) which have conductivity. In addition, the rubber like elastic bodies have a space between the rubber like elastic bodies. The two core wires extend in the upper and lower direction (longitudinal direction) and are fixed in the hollow part 52. As the object is disposed between the sliding door 1 and the rear end of the front door 2 when the sliding door 1 is moved towards the closed position, the object makes contact with a part of the hollow part 52, and then the two rubber like elastic bodies contact with each other and the two core wires short. Resultant change in electric signal is transmitted to a control unit joined with leads which are connected with the two core wires in a lower side terminal part of the touch sensor 50, and as a result, the object is detected.

A configuration of the sensor 160 is not limited as long as the sensor 160 is fixed in the hollow part 52 and detects the objects.

As illustrated in FIG. 2, the part of the touch sensor 50, which couples to the curve 1c of the flange 40, includes a raising member 70 inside the installation base member 51. The raising member 70 rises outwardly toward an exterior of the automobile from the interior.

The raising member 70 is divided into a plurality of (4 in the present embodiment) blocks 71 by supporting pillars 72 in an upper and lower direction of the automobile body. The plurality of blocks 71 are continuous and integral.

The blocks 71 are square hollow with one surface of each of the blocks 71 open. The surfaces which are open are arranged on an opening of the installation base member 51. More specifically, when the touch sensor 50 couples to the flange 40, the surfaces which are open of the blocks 71 are closer to a rear part of the automobile body.

The blocks 71 have grooves 75 formed on outer-cabin side surfaces of the blocks 71. The grooves 75 extend in the front and rear direction of the automobile body. More specifically, the grooves 75 are formed on outer-cabin side surfaces of the pillars 72, which divide the two adjacent blocks 71 in the upper and lower direction.

An upper end and a lower end of the raising member 70 have oblique surfaces 73, 74 respectively. The oblique surface 73 extends toward a lower part and the exterior of the automobile in relation to a surface perpendicular to the inner-cabin side wall 51a. The oblique surface 74 extends toward an upper part and the exterior of the automobile in relation to the surface perpendicular to the inner-cabin side wall 51a. The raising member 70 as a whole has a trapezoidal shape.

As illustrated in FIG. 5, the raising member 70 has height enough to form a space 100 between the raising member 70 and the outer-cabin side wall 51b for the flange 40 to be inserted.

In the present embodiment, the raising member 70 is formed by partially cutting out the touch sensor 50, formed by extrusion molding, and forming the raising member 70 by die molding.

Figure 3:
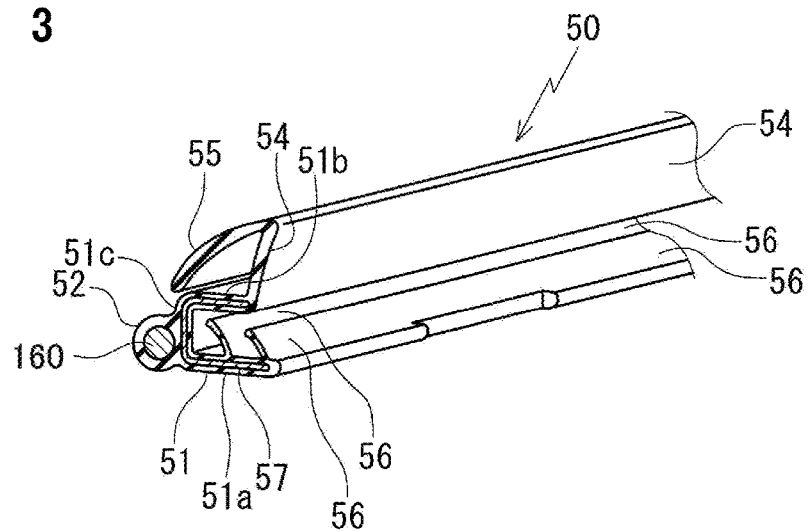
FIG. 3 is a perspective view of an important part of a manufacturing method according to an embodiment of the invention of a touch sensor formed by extrusion molding with a part cut out.

More specifically, the raising member 70 is formed by: cutting out an opening end of the inner-cabin side wall 51a of the installation base member 51, which is linearly formed by extrusion molding as illustrated in FIG. 3; arranging remaining parts of the touch sensor 50 on a die (not illustrated); and injecting material for die molding into a cavity of the die to form a die-molded inner-cabin side wall 61 and the raising member 70 by die molding on the part cut out from the inner-cabin side wall 51a.

The raising member 70 is formed by die molding while pressing two anchoring parts 56 on the inner-cabin side wall 51a of the installation base member 51 from the exterior of the automobile. A space between the inner-cabin side wall 51a and the anchoring parts 56, which are pressed down, and a reaction force from the anchoring parts 56 increase flexibility of the touch sensor 50 and improves followability of the touch sensor 50 on the curve 1c of the flange 40.

The material for die molding includes rubber-like elastic body. Examples of the rubber-like elastic body include EPDM of rubber materials, but are not specifically limited.

Examples of the rubber-like elastic body also include TPO and TPS of thermoplastic elastomer, but are not specifically limited. The rubber-like elastic body may be foamed or non-foamed, but non-foamed rubber-like elastic body is more preferable to secure rigidity of the die-molded part.

As a result, the die-molded inner-cabin side wall 61 is continuous and integral with the inner-cabin side wall 51a, which is formed by extrusion molding on an upper side and a lower side of the die-molded inner-cabin side wall 61.

Figure 4:
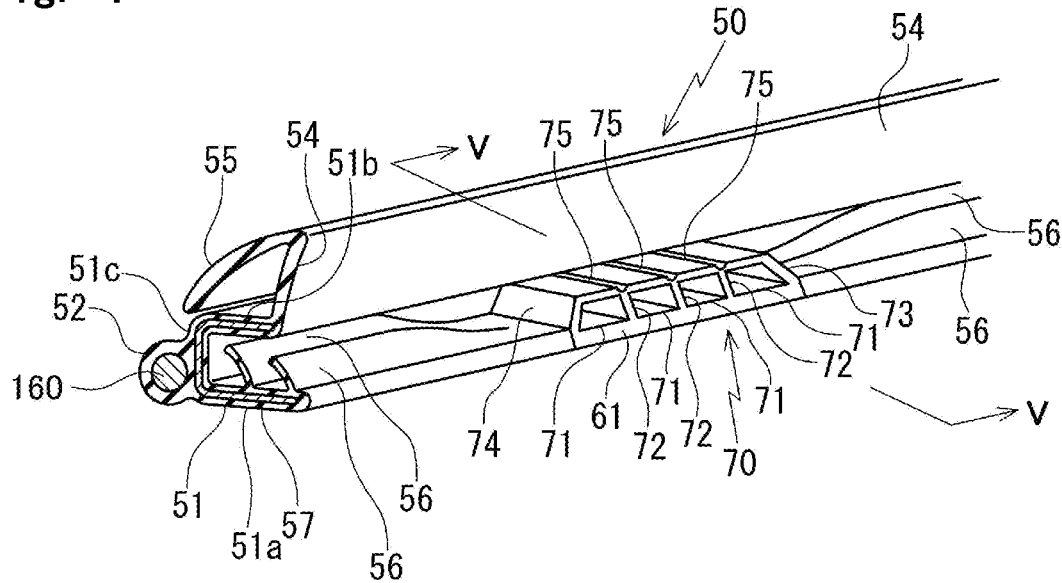
FIG. 4 is a perspective view of an important part of the manufacturing method according to the embodiment of the invention of the touch sensor with a raising member formed by die molding on the part cut out in FIG. 3.

The touch sensor 50 is linearly formed by extrusion molding and has the raising member 70 formed by die molding as illustrated in FIG. 4. An operator manually bends the touch sensor 50 as illustrated in FIG. 2 along the curve 1c of the flange 40 and couples the touch sensor 50 to the sliding door 1.

The hollow part 52 is not subjected to an extra process of cutting-out and the sensor 160 in the hollow part 52 is not subjected to a harmful effect.

With this configuration, the part of the touch sensor 50, which couples to the curve 1c of the flange 40 of the sliding door 1, includes the raising member 70. The curve 1c of the flange 40 is on the front end of the belt line 30. The raising member 70 rises outwardly toward the exterior of the automobile from the die-molded inner-cabin side wall 61. The raising member 70 includes the plurality of blocks 71. The plurality of blocks 71 exist along the upper and lower direction of the automobile body. With this configuration, the touch sensor 50 systematically follows the curve 1c. In other words, the touch sensor 50 is not subjected to force from the flange 40 to approach the exterior of the automobile even without crushing a part of the installation base member 51 or adhering an extra rubber plate or the like on the installation base member 51 as in the prior art.

Also, the space 100 is formed between the raising member 70 and the outer-cabin side wall 51b for the flange 40 to be inserted into the space 100. With this configuration, the touch sensor 50 stably couples to the flange 40 and hardly shifts with shocks on the touch sensor 50.

The raising member 70 is formed by: cutting out the inner-cabin side wall 51a of the touch sensor 50, which is formed by extrusion molding; and forming the die-molded inner-cabin side wall 61 and the raising member 70 by die molding. This configuration increases an area of close adherence between a part formed by extrusion molding and a part formed by die molding, and increases adhesion strength.

The plurality of blocks 71 have the grooves 75 formed on the outer-cabin side surfaces of the pillars 72. The plurality of blocks 71 form the raising member 70. The pillars 72 are between two adjacent blocks 71. With this configuration, the touch sensor 50 easily bends and follows the curve 1c of the flange 40 systematically.

In addition, the upper end and the lower end of the raising member 70 have the oblique surfaces 73, 74, which extend toward the lower part and the exterior of the automobile and the upper part and the exterior of the automobile, respectively, in relation to the surface perpendicular to the inner-cabin side wall 51a. With this configuration, the touch sensor 50 does not get caught by the flange 40 while coupling to the flange 40.

In the present embodiment, the operator manually bends the touch sensor 50, which is linearly formed by extrusion molding and has the raising member 70 formed by die molding as illustrated in FIG. 4, and couples the touch sensor 50 along the curve 1c of the flange 40. Another possible embodiment is that the raising member 70 is originally formed by die molding to fit the shape of the curve 1c of the flange 40 by: cutting out the opening end of the inner-cabin side wall 51a of the touch sensor 50, which is formed by extrusion molding; bending the touch sensor 50 to fit the shape of the curve 1c of the flange 40; arranging the bent touch sensor 50 on the die; and injecting material for die molding into the cavity of the die. Also, the blocks 71, which form the raising member 70, are square hollow, and have the grooves 75 formed on outer-cabin side surfaces of the blocks 71. In both cases, followability of the touch sensor 50 on the curve 1c of the flange 40 is improved.

The raising member 70 of the present embodiment does not complicate the shape of the die and is formed by die molding more simply than the raising member 70 of another possible embodiment, which is originally bent and formed by die molding to fit the shape of the curve 1c of the flange 40.

Figure 6:
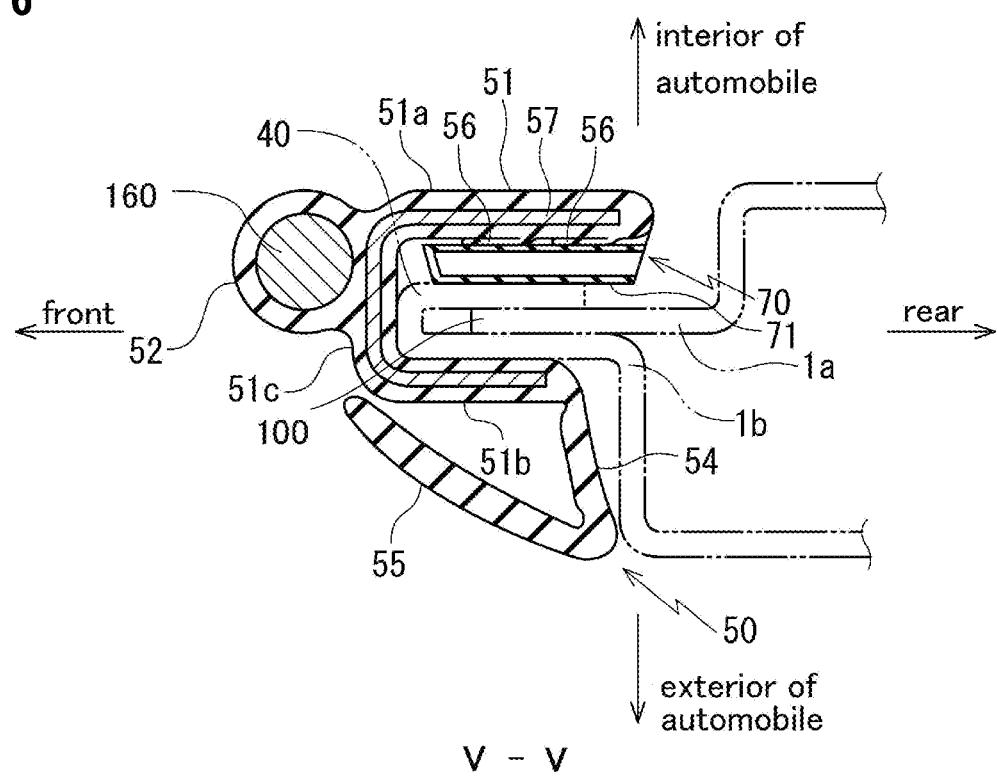
FIG. 6 is an enlarged cross-sectional view of a touch sensor according to another embodiment of the invention taken along line V-V of FIG. 4.
Figure 7:
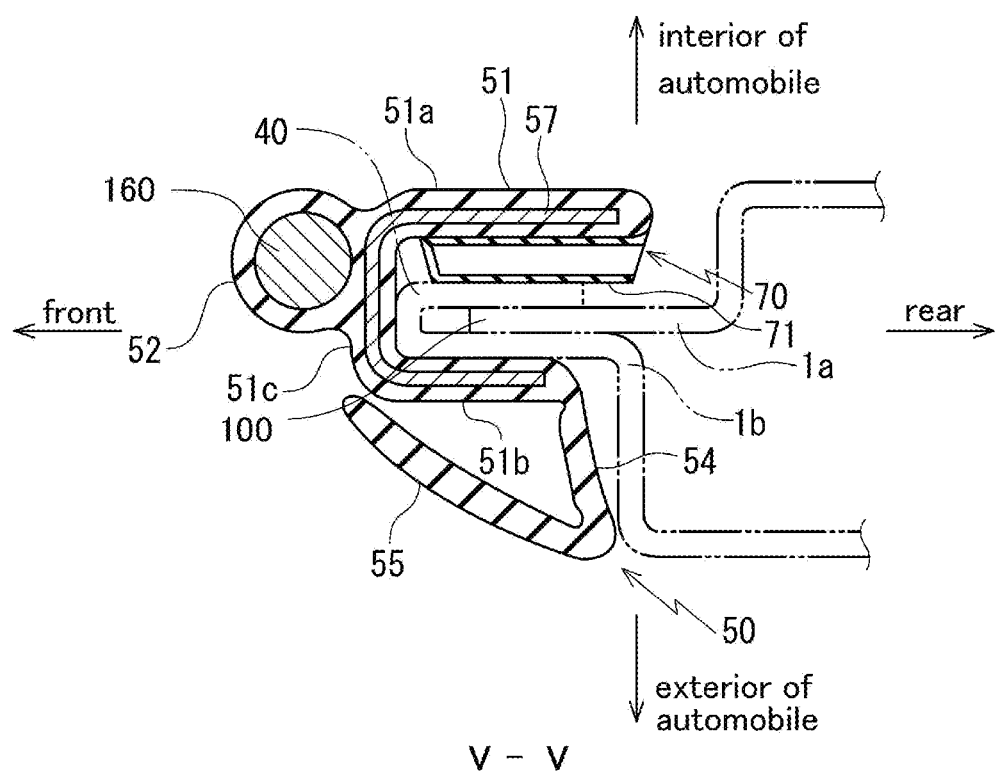
FIG. 7 is an enlarged cross-sectional view of a touch sensor according to another embodiment of the invention taken along line V-V of FIG. 4.

While in this embodiment the opening end of the inner-cabin side wall 51a of the installation base member 51, which is linearly formed by extrusion molding, is cut out, and the die-molded inner-cabin side wall 61 and the raising member 70 are formed by die molding on the part cut out from the inner-cabin side wall 51a as illustrated in FIG. 5, this should not be construed in a limiting sense. Another possible embodiment is, as illustrated in FIG. 6, the raising member 70 is formed by die molding on the outer-cabin side of the inner-cabin side wall 51a of the installation base member 51, which is linearly formed by extrusion molding, without forming a cutout. Another possible embodiment is, as illustrated in FIG. 7, the two anchoring parts 56 on the installation base member 51, which is linearly formed by extrusion molding, are cut out and the raising member 70 is formed by die molding on the outer-cabin side of the inner-cabin side wall 51a.

While in this embodiment the blocks 71, which form the raising member 70, are square hollow with one surface of each of the blocks 71 open, this should not be construed in a limiting sense. Another possible embodiment is that blocks 71 of the raising member 70 are solid.

Figure 8:
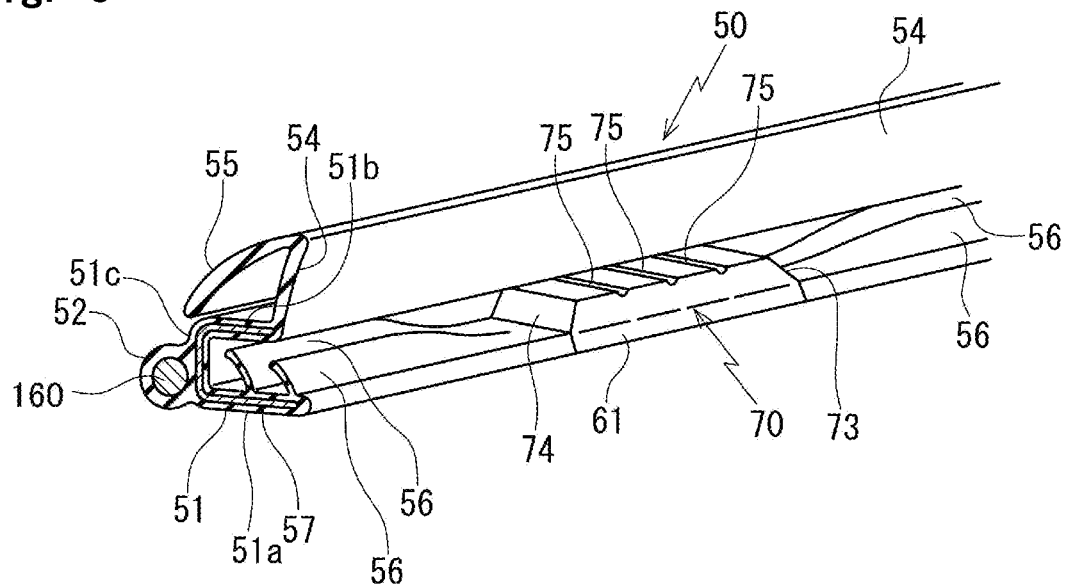
FIG. 8 is a perspective view of an important part of a manufacturing method according to another embodiment of the invention of the touch sensor with a solid raising member formed by die molding on the part cut out in FIG. 3.

The blocks 71 of the present embodiment are square hollow with one surface of each of the blocks 71 open, and the open surfaces are arranged on the opening of the installation base member 51 as illustrated in FIG. 4. With this configuration, the blocks 71 of the present embodiment are more securely prevented from unnecessary compression of the hollow part 52 with the sensor 160 fixed as compared with the solid blocks as illustrated in FIG. 8.

More specifically, when the touch sensor 50 follows a curve 1c, which is small in a curvature radius, and couples to the flange 40, deformation of the blocks 71, which are square hollow, absorb reaction from the curve 1c and tensile force on the open surfaces of the blocks 71 (close to end parts of the side walls 51a, 51b of the installation base member 51). With this configuration, compression of the sensor 160 in the hollow part 52 is prevented through closed surfaces (close to the connecting wall 51c of the installation base member 51) of the blocks 71, which are square hollow. On the other hand, the solid blocks do not deform as the blocks 71, which are square hollow. Accordingly, the reaction from the curve 1c and the tensile force on the side walls 51a, 51b of the installation base member 51 travel to the hollow part 52 through surfaces of the blocks 71 (close to the connecting wall 51c of the installation base member 51). As a result, the sensor 160 in the hollow part 52 is compressed and may result in a persistent connection. As the touch sensor 50 results in the persistent connection, the sensor 160 is incapable of detecting the objects.

The blocks 71, which are square hollow, reduce thickness of the die molded part, and therefore decrease flash and sink marks on the die molded part as compared with the solid blocks for the blocks 71.

Figure 9:
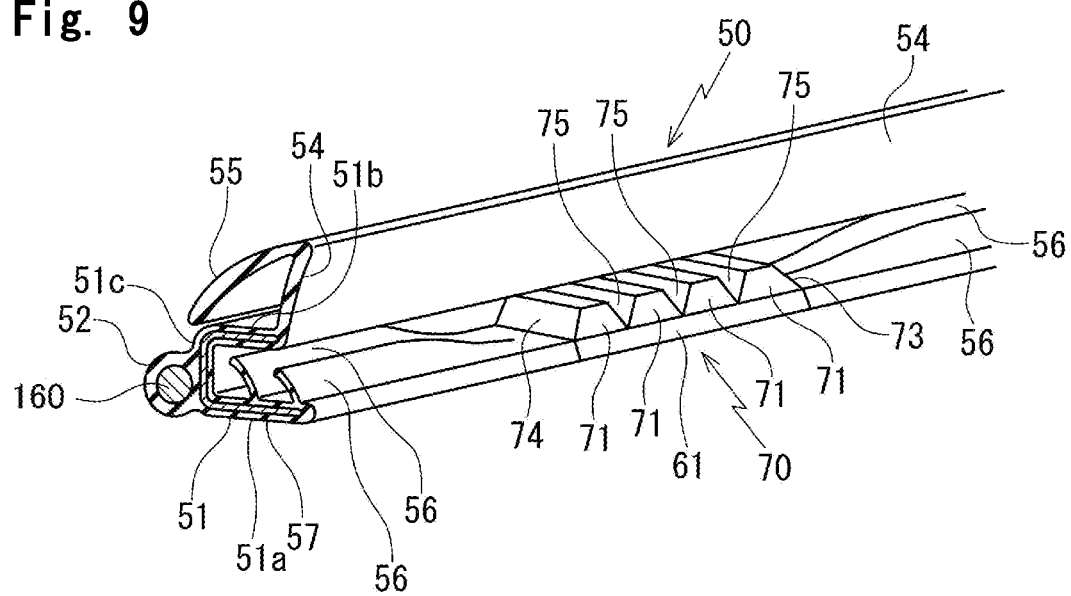
FIG. 9 is a perspective view of an important part of a manufacturing method according to another embodiment of the invention of the touch sensor with a raising member formed by die molding on the part cut out in FIG. 3, the raising member including a plurality of blocks formed at regular intervals.
Figure 10:
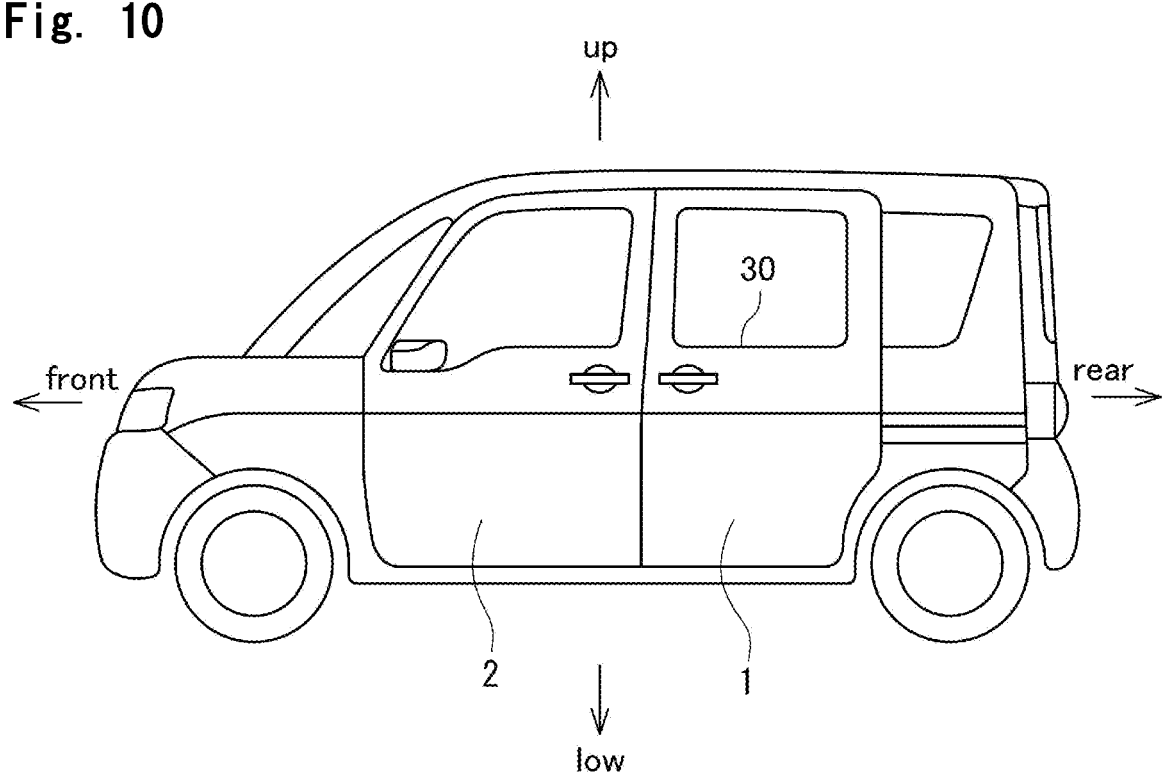
FIG. 10 is a left side view of an automobile of which sliding door moves to open and close an opening.
Figure 11:
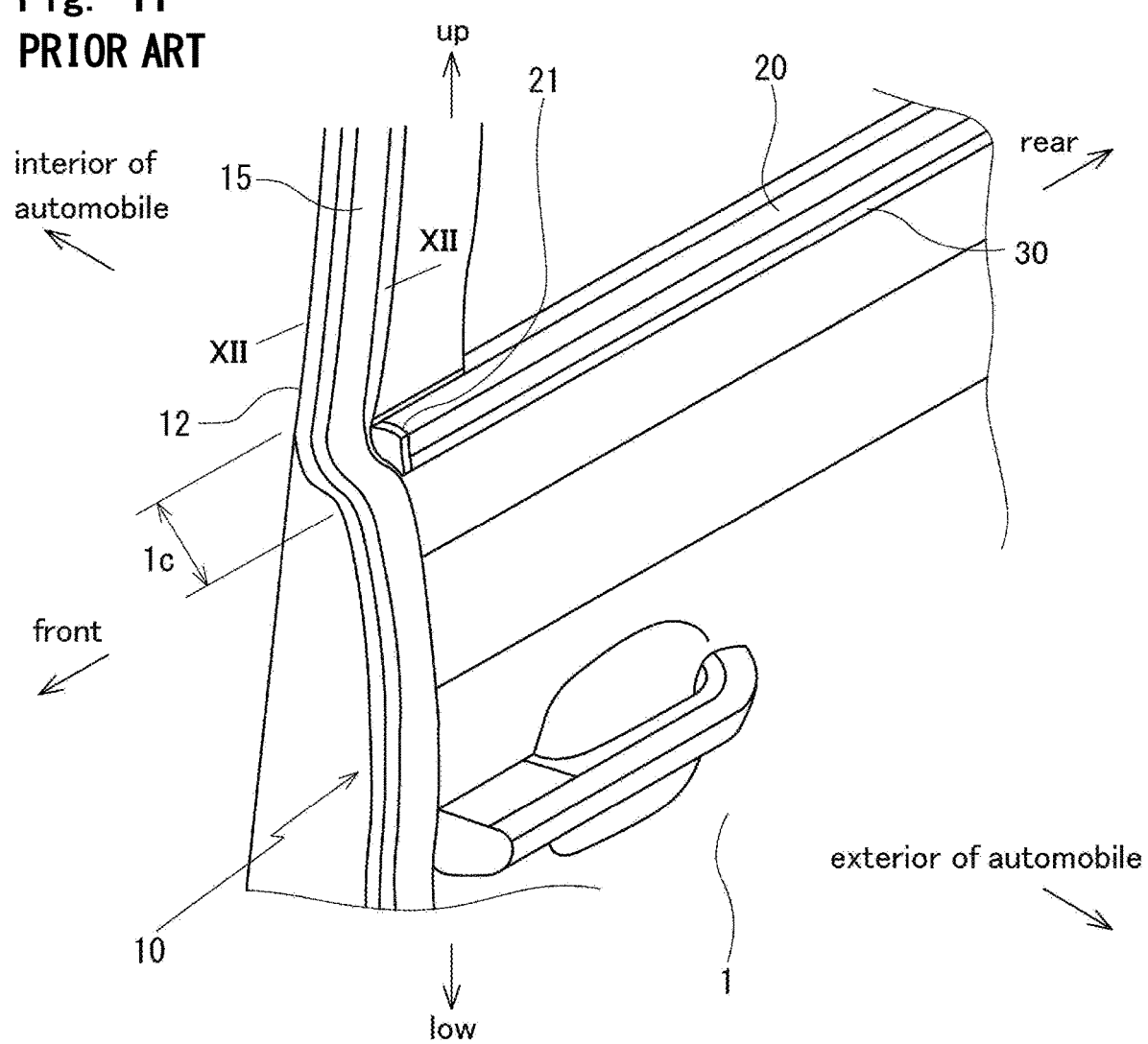
FIG. 11 is a perspective view of a left touch sensor according to a prior art coupling to a left sliding door.

Another possible embodiment is that the plurality of the blocks 71, which form the raising member 70, are formed at regular intervals as illustrated in FIG. 9.

With this configuration, the touch sensor 50 is more flexible due to spaces between two adjacent blocks 71.

While in the present embodiment, the touch sensor 50 detects the object such as the part of human bodies (fingers, hands or legs) between the sliding door 1 and the rear end of the front door 2 as the opening of the automobile body, this should not be construed in a limiting sense. Another possible embodiment is that the touch sensor 50 detects the object between the sliding door 1 and the circumferential edge of the body panel 5 as the opening of the automobile body, not the front door 2.

We claim:
1. A coupling structure including a touch sensor, the coupling structure comprising:

a sliding door which moves between at least two positions to open and close an opening of an automobile body;
a flange on a front edge of the sliding door, the flange extending in an upper-lower direction of the automobile body and having a curve on a belt line, and the curve having a convex shape toward an interior of the automobile; and
the touch sensor, the touch sensor being configured to operably couple to the flange, and the touch sensor including:
an installation base member having a substantially U-shaped cross section including an inner-cabin side wall, an outer-cabin side wall, and a connecting wall, the connecting wall connecting the side walls, the installation base member having a plurality of anchoring parts formed on an inner side thereof, and the anchoring parts extending toward the inner side;
a hollow part unified with the connecting wall, the hollow part being configured to make elastic contact with an object disposed between the sliding door and the opening of the automobile body or a rear end of a front door; and
a sensor fixed in the hollow part, the sensor being configured to output a corresponding electric signal when the object makes contact with the hollow part,
wherein a part of the touch sensor which is configured to operably couple to the curve of the flange comprises:
a raising member which rises outwardly toward an exterior of the automobile from the inner-cabin side wall, the raising member including a plurality of blocks, and the plurality of blocks being provided along the upper-lower direction of the automobile body; and
a space between the raising member and the outer-cabin side wall into which the flange is insertable, and
wherein the plurality of the blocks which form the raising member are continuous and integral with each other.

2. The coupling structure as claimed in claim 1, wherein grooves are provided on outer-cabin side surfaces of the plurality of blocks.

3. The coupling structure as claimed in claim 2, wherein supporting pillars are provided between each pair of two adjacent blocks among the plurality of blocks, and
wherein the grooves are provided on outer-cabin side surfaces of the pillars.

4. The coupling structure as claimed in claim 1, wherein an upper end of the raising member has a first oblique surface, a lower end of the raising member has a second oblique surface, and the first and second oblique surfaces face toward a lower part and the exterior of the automobile and an upper part and the exterior of the automobile, respectively, in relation to a surface perpendicular to the inner-cabin side wall.

5. A coupling structure including a touch sensor, the coupling structure comprising:
a sliding door which moves between at least two positions to open and close an opening of an automobile body;
a flange on a front edge of the sliding door, the flange extending in an upper-lower direction of the automobile body and having a curve on a belt line, and the curve having a convex shape toward an interior of the automobile; and
the touch sensor, the touch sensor being configured to operably couple to the flange, and the touch sensor including:
an installation base member having a substantially U-shaped cross section including an inner-cabin side wall, an outer-cabin side wall, and a connecting wall, the connecting wall connecting the side walls, the installation base member having a plurality of anchoring parts formed on an inner side thereof, and the anchoring parts extending toward the inner side;
a hollow part unified with the connecting wall, the hollow part being configured to make elastic contact with an object disposed between the sliding door and the opening of the automobile body or a rear end of a front door; and
a sensor fixed in the hollow part, the sensor being configured to output a corresponding electric signal when the object makes contact with the hollow part,
wherein a part of the touch sensor which is configured to operably couple to the curve of the flange comprises:
a raising member which rises outwardly toward an exterior of the automobile from the inner-cabin side wall, the raising member including a plurality of blocks, and the plurality of blocks being provided along the upper-lower direction of the automobile body; and
a space between the raising member and the outer-cabin side wall into which the flange is insertable, and
wherein the plurality of the blocks which form the raising member are formed at regular intervals.

6. A coupling structure including a touch sensor, the coupling structure comprising:
a sliding door which moves between at least two positions to open and close an opening of an automobile body;
a flange on a front edge of the sliding door, the flange extending in an upper-lower direction of the automobile body and having a curve on a belt line, and the curve having a convex shape toward an interior of the automobile; and
the touch sensor, the touch sensor being configured to operably couple to the flange, and the touch sensor including:
an installation base member having a substantially U-shaped cross section including an inner-cabin side wall, an outer-cabin side wall, and a connecting wall, the connecting wall connecting the side walls, the installation base member having a plurality of anchoring parts formed on an inner side thereof, and the anchoring parts extending toward the inner side;
a hollow part unified with the connecting wall, the hollow part being configured to make elastic contact with an object disposed between the sliding door and the opening of the automobile body or a rear end of a front door; and
a sensor fixed in the hollow part, the sensor being configured to output a corresponding electric signal when the object makes contact with the hollow part,
wherein a part of the touch sensor which is configured to operably couple to the curve of the flange comprises:
a raising member which rises outwardly toward an exterior of the automobile from the inner-cabin side wall, the raising member including a plurality of blocks, and the plurality of blocks being provided along the upper-lower direction of the automobile body; and
a space between the raising member and the outer-cabin side wall into which the flange is insertable, and wherein each of the blocks has a hollow square shape with one surface thereof being open, the open surface being arranged on an opening of the installation base member.

* * * * *